July 4, 1950   E. J. BASTIN, JR., ET AL   2,513,989
FILM HOLDER
Filed May 2, 1947
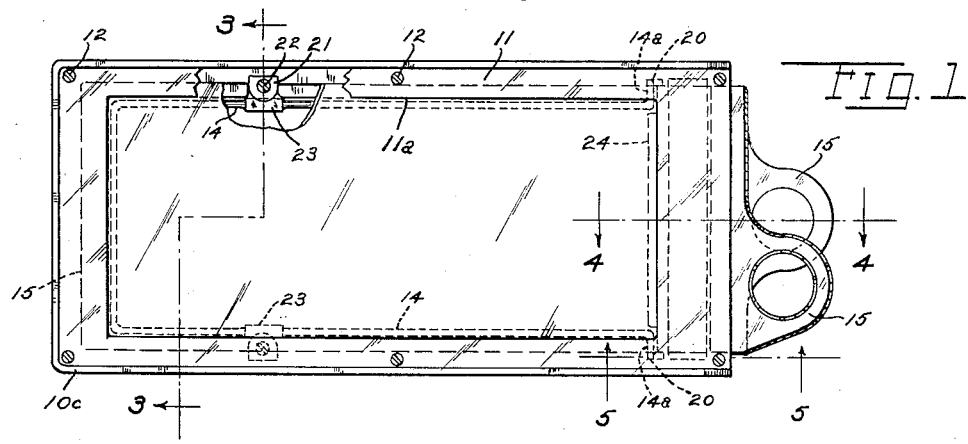
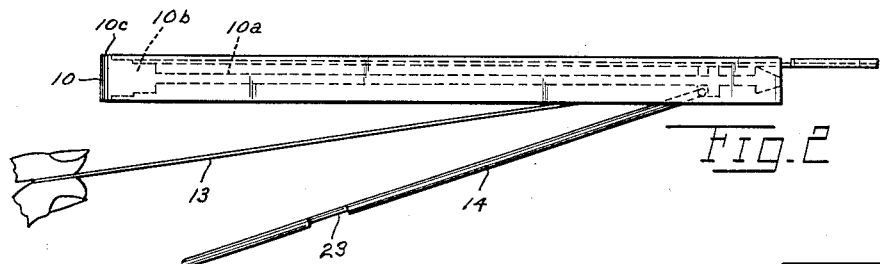
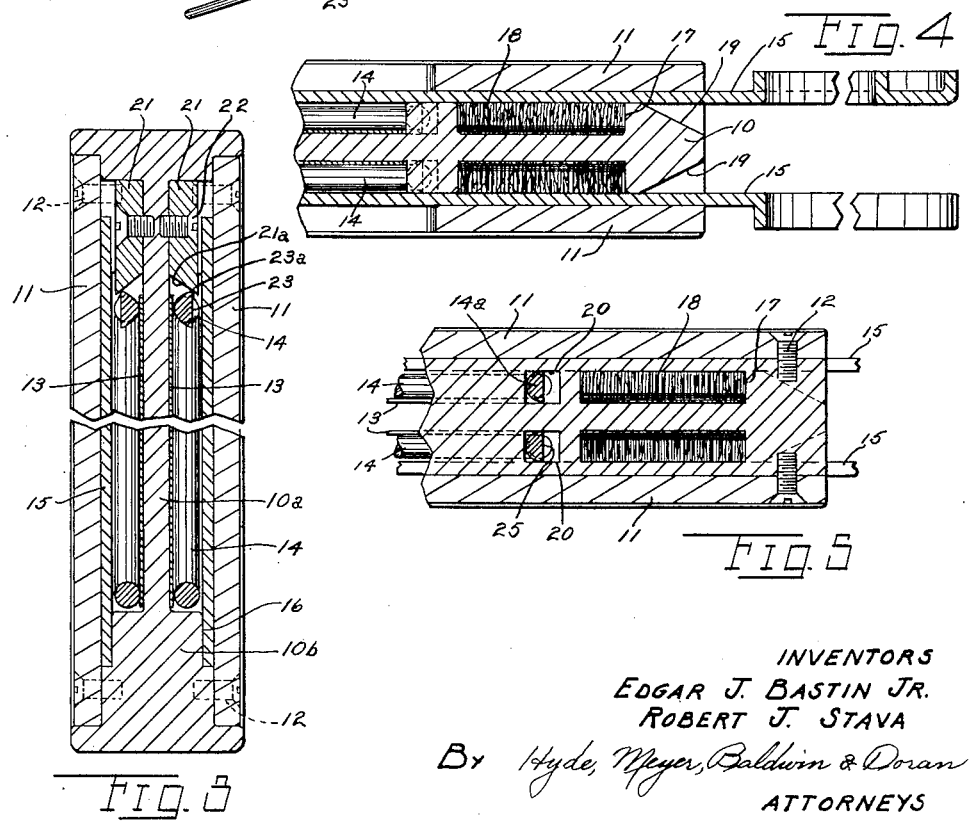
INVENTORS
EDGAR J. BASTIN JR.
ROBERT J. STAVA
By Hyde, Meyer, Baldwin & Doran
ATTORNEYS Patented July 4, 1950

2,513,989

UNITED STATES PATENT OFFICE 2,513,989

FILM HOLDER

Edgar J. Bastin, Jr., Cleveland, and Robert J. Stava, University Heights, Ohio, assignors to Picker X-Ray Corporation Waite Manufacturing Division, Inc., Cleveland, Ohio, a corporation of Ohio Application May 2, 1947, Serial No. 745,437

1 Claim. (Cl. 95—68)

This invention relates to improvements in a film holder or cassette for holding sensitized sheets for exposure.

An object of the present invention is to provide a film holder which is compact and of light weight, which is easily loaded and unloaded in a dark room and which will firmly hold a sensitized sheet in a fixed focal plane.

Other objects and advantages of the present invention will be apparent from the accompanying drawings and specification and the essential features thereof will be set forth in the appended claim.

In the drawings,

Fig. 1 is a top plan view of a film holder embodying our invention with parts broken away to more clearly show the construction;

Fig. 2 is a side elevational view of the device of Fig. 1 with one of the dark slides removed and with the film clamping member raised to permit the insertion of a sheet of film;

Fig. 3 is a transverse sectional view enlarged taken along the line 3—3 of Fig. 1; while Figs. 4 and 5 are enlarged fragmental sectional views taken along similarly numbered lines of Fig. 1.

Our improved film holder comprises a light tight casing 10 having a wall 10a intermediate the outer faces of the casing and presenting flat wall faces in opposite directions. Around the edges of this wall the casing frame is thickened as indicated at 10b in Figs. 2 and 3. A bead 10c around the outer periphery of the casing serves to position retaining plates 11 of which there are two, one on each side of the casing. These retaining plates are of hollow rectangular shape and the inner opening 11a defines an exposure opening on each side of the casing opposite the flat wall 10a. The retaining plate is secured to the thickened portion 10b of the casing by screws 12. A sensitized sheet 13 to be exposed is adapted to be held against the flat wall 10a by a U-shape clamping or retaining member 14 after which a dark slide 15 is slid into position in a groove 16 which is formed between the casing portion 10b and the retaining plate 11. Obviously, there are two of these dark slides each adapted to overlie its associated retaining member 14 and to close the opening 11a.

Referring to Figs. 1, 4 and 5, means is provided at the right-hand end of the casing as viewed in Figs. 1 and 4 to prevent the entrance of light at the point where the slides 15 reciprocate between the casing 10 and the retaining plate 11. As shown, this comprises a pocket 17 on each side of the central casing member filled with plush 18, which sealing encases the dark slide so as to prevent the entrance of light at that zone. The casing 10 may be slightly beveled as indicated at 19 in Fig. 4 so as to facilitate the introduction of the dark slides.

Novel means is provided for holding the sensitized sheet 13 against the flat wall face 10a. On each side of this wall is provided a U-shape retaining member 14 of wire or the like, three sides of which lie closely adjacent three sides of the exposure opening 11a, as clearly shown in Fig. 1. Means is provided for hinging the member 14 on a pivotal axis adjacent the fourth side of the opening 11a so that the member 14 may be swung out through the opening 11a as indicated in Fig. 2, so as to permit a sensitized sheet 13 to be placed against the wall 10a. The pivotal means here shown comprises a bending of the free ends of the member 14 outwardly as indicated at 14a in Fig. 1 along a pivotal axis adjacent the right-hand end of the opening 11a. A simple but efficient means is adopted for holding the ends 14a in the casing. For this purpose, a pocket 20 is formed in the casing to receive each of the ends 14a. These pockets are open at the face of the casing but are closed by the plate 11 which rests fairly snugly against the ends 14a so as to provide a slight frictional resistance to the oscillation of the member 14 to the position of Fig. 2. The ends 14a may be flattened slightly as indicated at 25 in Fig. 5 for the purpose of promoting sufficient frictional engagement to hold the member 14 in any position to which it is moved.

Means is provided for holding the member 14 against the sensitized sheet 13 to retain it against the wall 10a. As best shown in Figs. 1 and 3, adjacent an intermediate portion of each of the longer legs of the U-shape member 14 is provided a catch 21, each catch being secured to the casing 10 by means of a screw 22. Each catch 21 has an inner face 21a which is inclined toward the wall 10a and toward the side of the casing so as to urge the member 14 down the incline toward the wall 10a. Preferably also, the member 14 is slightly flattened on one side as indicated at 23 so as to provide a sharp edge 23a adapted to engage the inclined face 21a of the catch so as to enhance the action of the catch in pressing the member 14 against the sensitized sheet 13.

The operation of our improved film holder should now be apparent. With the member 14 in the position of Fig. 2 in the dark room, the operator places a sensitized sheet 13 against the wall 10a and presses the member 14 inwardly causing the edges 23a of the member 14 to engage beneath the catches 21. There is sufficient resiliency in the wire of the member 14 to permit such a snapping action of the portions 23 beneath the catches. A dark slide 15 is then slipped into the position indicated in Fig. 1 readily sliding over the member 14 in its closed position. One or both sides of the film holder may be thus loaded after which the cassette is placed in an X-ray machine or other exposure apparatus, the dark slide removed and an exposure made in the usual manner. After this the dark slide is again inserted and the film holder is taken to a dark room where the dark slide is again removed and the longer legs of the member 14 are squeezed inwardly a slight amount which disengages the thickened portions 23 from beneath the catches 21 so that the member 14 may be swung outwardly, as shown in Fig. 2, for the removal of the exposed film. To prevent the disengagement of the legs 14a from the pockets 20 during this film removal operation, an abutment 24 may be provided on a portion of the casing so as to prevent movement of legs 14a away from the pockets 20.

What we claim is:

In a film holder for holding sensitized sheets for exposure, the combination with a light tight casing having a fixed flat wall and having a planar exposure opening of rectangular shape in a side opposite said wall, of a U-shape wire member extending around three sides of the periphery of said opening and wholly on the flat wall side of the plane of said opening, the free ends of the legs of said U-shape member being turned outwardly to enter recesses, there being recesses formed in said casing to receive said out-turned ends, whereby to form hinge connections with said casing adjacent said wall, catches located on said casing adjacent said wall and adjacent intermediate portions of the legs of said U-shape member, said wire member having spring characteristics, and said legs adapted to bend laterally to snap under said catches, whereby to retain said member against said wall.

EDGAR J. BASTIN, JR.
ROBERT J. STAVA.

REFERENCES CITED

The following references are of record in the file of this patent:

UNITED STATES PATENTS

| Number | Name | Date |
|---|---|---|
| 315,219 | Barker | Apr. 7, 1885 |
| 476,203 | Hetherington | May 31, 1892 |
| 1,933,823 | Nagel | Nov. 7, 1933 |